(12) United States Patent
Usuda et al.

(10) Patent No.: US 7,746,770 B2
(45) Date of Patent: Jun. 29, 2010

(54) CONTROL METHOD AND DEVICE OF JITTER BUFFER

(75) Inventors: Kazuto Usuda, Gumma (JP); Yukihiro Mizukoshi, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 1494 days.

(21) Appl. No.: 10/692,687

(22) Filed: Oct. 27, 2003

(65) Prior Publication Data

US 2004/0179474 A1 Sep. 16, 2004

(30) Foreign Application Priority Data

Mar. 11, 2003 (JP) .............................. 2003-064995

(51) Int. Cl.
*H04L 1/00* (2006.01)
*G06F 7/78* (2006.01)
*G06F 5/06* (2006.01)

(52) U.S. Cl. .................. 370/229; 370/412; 370/516; 709/235; 710/54; 710/58

(58) Field of Classification Search .............. 370/212, 370/229, 412–419, 428, 503–517; 709/232, 709/235
See application file for complete search history.

(56) References Cited

U.S. PATENT DOCUMENTS

| 5,400,329 | A | * | 3/1995 | Tokura et al. | 370/232 |
|---|---|---|---|---|---|
| 6,044,113 | A | * | 3/2000 | Oltean | 375/238 |
| 6,252,850 | B1 | * | 6/2001 | Lauret | 370/235 |
| 6,360,271 | B1 | * | 3/2002 | Schuster et al. | 709/231 |
| 6,400,683 | B1 | * | 6/2002 | Jay et al. | 370/229 |
| 6,434,606 | B1 | * | 8/2002 | Borella et al. | 709/214 |
| 6,658,027 | B1 | * | 12/2003 | Kramer et al. | 370/516 |
| 6,738,916 | B1 | * | 5/2004 | Gladden et al. | 713/400 |
| 6,856,615 | B1 | * | 2/2005 | Barve | 370/352 |
| 6,987,775 | B1 | * | 1/2006 | Haywood | 370/429 |
| 7,020,791 | B1 | * | 3/2006 | Aweya et al. | 713/400 |
| 7,085,236 | B2 | * | 8/2006 | Oldak et al. | 370/235.1 |
| 7,349,399 | B1 | * | 3/2008 | Chen et al. | 370/394 |
| 2002/0009054 | A1 | * | 1/2002 | Suzuki et al. | 370/252 |
| 2003/0021285 | A1 | * | 1/2003 | Denninghoff | 370/428 |
| 2004/0057445 | A1 | * | 3/2004 | LeBlanc | 370/412 |
| 2004/0062252 | A1 | * | 4/2004 | Dowdal et al. | 370/395.62 |
| 2004/0120395 | A1 | * | 6/2004 | Orr et al. | 375/237 |
| 2004/0141528 | A1 | * | 7/2004 | LeBlanc et al. | 370/508 |
| 2004/0193762 | A1 | * | 9/2004 | Leon et al. | 710/52 |

FOREIGN PATENT DOCUMENTS

| JP | 09-261613 | 10/1997 |
|---|---|---|
| JP | 2001-274829 | 10/2001 |
| JP | 2002-165148 | 6/2002 |
| JP | 2003-046490 | 2/2003 |

* cited by examiner

*Primary Examiner*—Steven H Nguyen
*Assistant Examiner*—Curtis A Alia
(74) *Attorney, Agent, or Firm*—Studebaker & Brackett PC; Donald R. Studebaker

(57) ABSTRACT

The invention provides a method of controlling a jitter buffer, which sets a packet delete area, a packet add area, and a clock control area inside a FIFO forming the jitter buffer. The method controls to delete packets when the stored packet quantity is within the packet delete area, controls to add packets when the stored packet quantity is within the packet add area, and controls to raise or lower the clock frequency for reading the packets when the stored packet quantity is within the clock control area, in which the clock control area is set between the packet add area and the packet delete area.

12 Claims, 5 Drawing Sheets

Tj: current stored packet quantity
T0: lower limit of packet add area
T1: upper limit of packet add area
T2: lower fluctuating value of clock control area
T3: upper fluctuating value of clock control area
T4: lower limit of packet delete area
T5: upper limit of packet delete area jitter quantity (ms)

stored packet quantity (packets)

reproduced clock frequency (Hz)

added/deleted packets (packets)

state transition of clock frequency addition/deletion of voice packets

CONTROL METHOD AND DEVICE OF JITTER BUFFER

BACKGROUND OF THE INVENTION

1. Field of the Invention

The present invention relates to a control method of a jitter buffer that temporarily stores communication packets in the VOIP (Voice Over Internet Protocol).

2. Description of the Related Art

In recent years, the internet telephone has remarkably been spreading, and the sound quality thereof has been improved to such a level that practical inconveniences can hardly be found. And, the means to attain this level has adopted a method, which temporarily stores received packets in a jitter buffer, and thereby absorbs jitters accompanied with the packets. The extent of jitters in the packet transmission through the internet is about 100 ms, however the frame length in the packet transmission conforming to the International Standard G.729 is 10 ms. Accordingly, the jitter buffer needs a capacity to contain the packets of 10 frames at the minimum. However in the VOIP, if the capacity of the jitter buffer is too large, it will produce a delay time proportional to the capacity of the jitter buffer, after the counterpart finishes talking. This delay will interrupt the conversation, and further make produced echoes stand out, which deteriorates the sound quality of talks.

In order to solve this problem, a conventional technique, for example, sets a "disposal starting threshold" and a "disposal ending threshold" in the jitter buffer, executes the disposal processing of the packets according to the contents of voice data to thereby restrict the capacity of the jitter buffer, and inserts the "voice data of minute noises" to prevent interrupting voices and sounds (patent document 1: the Japanese Published Unexamined Patent Application No. 274829/2001).

Or, another conventional technique measures an available residual quantity of a reception buffer (jitter buffer), determines a clock frequency for setting the read timing in order that the available residual quantity always be within a predetermined range, and thereby restricts the capacity of the reception buffer (patent document 2: the Japanese Published Unexamined Patent Application No. 261613/1997).

However, the technique disclosed in the patent document 1 determines to or not to apply the disposal processing according to the contents of the voice data; accordingly, if there occurs a burst of jitters, it will lead to extinguishing a large quantity of packets, which produces distortions on reproduced voices. And, if such a processing is executed to a silent interval, such distortions will not be produced; however a calculation processing of the sound pressure becomes necessary, and the load to the software and hardware becomes increased accordingly.

Or, the technique disclosed in the patent document 2 determines the clock frequency for setting the reading speed by measuring the available residual quantity of the reception buffer, and controls the capacity of the reception buffer. However, the document does not disclose as to what kind of countermeasures can be taken, when there occurs a burst of jitters and the available residual quantity is nonexistent.

SUMMARY OF THE INVENTION

This invention has been made in view of the above problems, and it provides a method and device for controlling a jitter buffer, which avoids the delay of packets by adding and deleting the packets to enhance the sound quality of talks. The method further lessens the loss of communication packets by fluctuating the reproduced clock frequency to thereby reduce the distortions of voices.

In order to accomplish the above problems, according to one aspect of the invention, the method of controlling a jitter buffer sets a packet delete area, a packet add area, and a clock control area inside a FIFO that forms the jitter buffer. The method controls to delete the packets when a stored packet quantity Tj of the FIFO is within the packet delete area, to add the packets when the stored packet quantity Tj is within the packet add area, and to raise or lower the clock frequency for reading the packets when the stored packet quantity Tj is within the clock control area, in which the clock control area is set between the packet add area and the packet delete area.

DETAILED DESCRIPTION OF THE PREFERRED EMBODIMENTS

Figure 1:
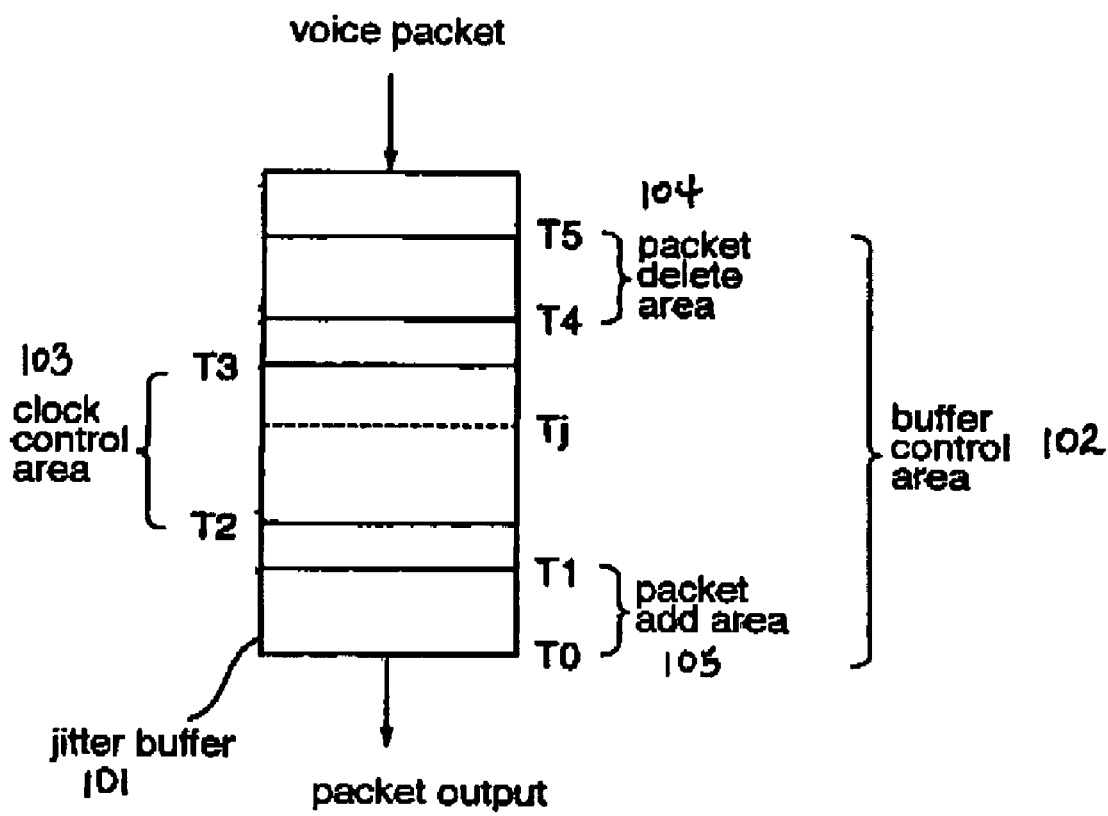
FIG. 1 is a conceptual chart explaining the method of controlling a jitter buffer in the first embodiment of the invention.

The preferred embodiments of the invention will be described in detail with reference to the accompanying drawings. FIG. 1 is a conceptual chart explaining the method of controlling the jitter buffer in the first embodiment of the invention. Generally, a jitter buffer 101 is configured with a FIFO (First In First Out), and the voice packets written in from the input terminal are located to the trailing one of the voice packets having been arranged from the output terminal, which are sequentially read out from the output terminal. A packet stored quantity surveillance described later detects the trailing packet of a voice packet string, and detects the stored packet quantity Tj at that moment. In this embodiment, the method uses this stored packet quantity Tj as a guidepost in controlling the jitter buffer 101, and sets two areas inside the jitter buffer.

One of the two areas is a buffer control area 102, which includes a packet delete area 104 and a packet add area 105. This area 102 sets the upper limit T1 of the packet add area 105 being the practical minimum size of the jitter buffer 101, and the lower limit T4 of the packet delete area 104 being the maximum size thereof.

The upper limit T1 of the packet add area is the minimum buffer size for absorbing jitters. If the quantity of packets becomes lower than this value, it will increase the possibility of producing missing voice packets, while the jitters cannot be absorbed. Therefore, it is preferable that this value T1 is preset with reference to actual measurements and the like.

On the other hand, the lower limit T4 of the packet delete area is related to the delay of the voice signal in the VOIP. To set this value larger will produce harmful effects such as echoes created by the delay of packets, which deteriorates the sound quality of talks. Therefore, it is also preferable in the same manner as above that this value T4 is preset with reference to actual measurements and the like. The upper limit T5 of the packet delete area is a means not to increase any more the voice packets stored in the jitter buffer 101. Since the packets inputted to exceed this value are to be deleted, when the jitter buffer 101 is built up inside a RAM, this value T5 is equivalent to the physical maximum size thereof.

Another one area in the jitter buffer is a clock control area 103, which is allocated between the levels T2 and T3. In the same manner as above, the levels T2 and T3 are preset on the basis of actual measurements and the like. When the stored packet quantity Tj becomes lower than the level T2, the reading clock frequency is controlled into a lower frequency. When the stored packet quantity Tj exceeds the level T3, the reading clock frequency is controlled into a higher frequency.

The control of the reading clock frequency is executed to have a hysteresis characteristic. That is, the moment when the currently stored packet quantity Tj becomes lower than the level T2, even if it restores a level exceeding T2 immediately after that moment, the clock frequency will not be changed. In the same manner, the moment when the currently stored packet quantity Tj becomes higher than the level T3, even if it returns to a level lower than T3 immediately after that moment, the clock frequency will not be changed. The reason for this control lies in that, since the stored packet quantity Tj fluctuates from moment to moment, to change the clock frequency each time leads to producing distortions on reproduced sounds in some cases.

According to this embodiment, the clock control area is set between the packet add area 105 and the packet delete area 104 of the buffer control area. The reason for this setting is based on a consideration that, since the change of the clock frequency is gradual and the fluctuation thereof cannot be set to a large level, it is very difficult to adapt a situation that needs a quick decrease of the buffer size, immediately after when there occurs a sporadic jitter burst.

As the result, when the stored packet quantity Tj at the present moment is about to exceed the lower limit T4 of the packet delete area 104, the voice packets are deleted, which maintains the maximum size of the buffer control area. Also, when the stored packet quantity Tj becomes lower than the upper limit T1 of the packet add area, the voice packets are refilled, which maintains the minimum size of the buffer control area.

When the stored packet quantity Tj exceeds the lower limit T4 of the packet delete area 104, and the packets are deleted, if the packets are located inside a silent interval, it is conceivable that there is not any influence on the reproduced sound quality. But, if the voice packets being located inside an interval with sounds are deleted at a burst, conceivably it will give a significant influence on the reproduced sound quality. In order to minimize this influence, it is necessary to expand the difference between the levels T3 and T4, or to increase the extent of raising the clock frequency. That is, the method raises the clock frequency a little early to absorb the jitters, and thereby reduces the number of the voice packets to be deleted.

And, there are several methods for refilling the voice packets, when the stored packet quantity Tj becomes lower than the upper limit T1 of the packet add area. One of the most general methods is to output the same packet as the previous one. Also in this case, in the same manner as above, if the packets inside an interval with sounds are added at a burst, conceivably it will give an influence on the reproduced sound quality to no small extent. In order to minimize this influence, in the same manner as above, it is necessary to expand the difference between the levels T2 and T1, or to increase the extent of lowering the clock frequency. That is, the method lowers the clock frequency a little early to reduce the number of the voice packets to be added.

However, even when the stored packet quantity Tj is reduced lower than the upper limit T1 of the packet add area, the voice packets are present in the buffer. Therefore, it is not necessarily needed to add the packets, or even if it is needed, it is possible to add the packets scatteredly with received voice packets mixed.

Here, it is possible to set the level of the packet add area to T1=T0. However, this case will have to continue adding the packets at the moment when the stored packet quantity Tj reached this level.

Figure 4A:
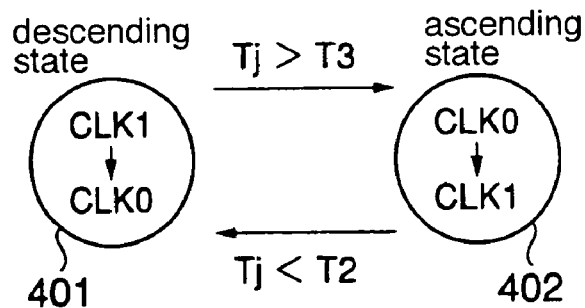
FIGS. 4(A) and 4(B) illustrate state transition diagrams in the first embodiment of the invention.

FIG. 4 illustrates state transition diagrams in the first embodiment, and FIG. 4(A) illustrates a transition state of the clock frequency. The transition state of the clock frequency possesses an ascending state 402 that changes from CLK0 into CLK1, and a descending state 401 that changes from CLK1 into CLK0. When the clock frequency is in the descending state at the beginning, and the stored packet quantity Tj at that moment exceeds the level T3, the state changes into the state to ascend the clock frequency, which will accelerate the processing of the packets stored in the buffer. In reverse, when the clock frequency is in the ascending state at the beginning, and the stored packet quantity Tj at that moment falls below the level T2, the state changes into the state to descend the clock frequency, which will prevent the situation that the voice packets in the jitter buffer 101 are insufficient.

Figure 4B:
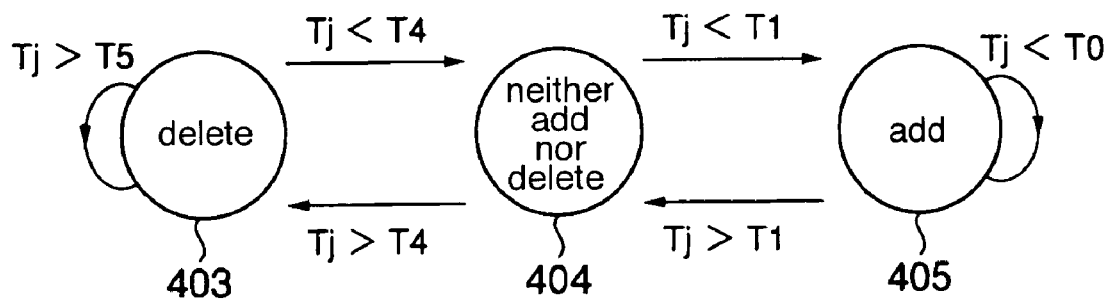

The transition diagram in FIG. 4(B) illustrates the transition state relating to the addition/deletion of the voice packets. As shown in the drawing, the state transition diagram possesses a delete state 403 of the voice packets, an add state 405 of the voice packets, and a state 404 that neither adds nor deletes the voice packets. The initial state is assumed to be the state 404 that neither adds nor deletes, and as the stored packet quantity Tj exceeds the lower limit T4 of the packet delete area 104, the state shifts into the delete state 403 to delete the voice packets, which will maintain the maximum size of the buffer control area. As the stored packet quantity Tj falls below the T4, the state returns to the initial state 404.

And, as the stored packet quantity Tj exceeds the upper limit T5 of the packet delete area 104, the state remains at the delete state 403. On the other hand, when the state is the initial, as the stored packet quantity Tj falls below the upper limit T1 of the packet add area 105, the state shifts into the add state 405 of the voice packets, which will maintain the minimum size of the buffer control area. As the Tj exceeds the T1 at this moment, the state returns to the initial state 404. And, as the stored packet quantity Tj is about to fall below the lower limit T0 of the packet add area 105, the state will remain at the add state 405 of the voice packets.

Even when the stored packet quantity Tj is about to fall below the lower limit T0 of the packet add area, there remain the packets in the buffer, and it is not necessarily needed to add the packets. However, to add the packets sparsely with the received packets mixed will prevent intermittence of voices without increasing distortions of reproduced voices.

Figure 2A:
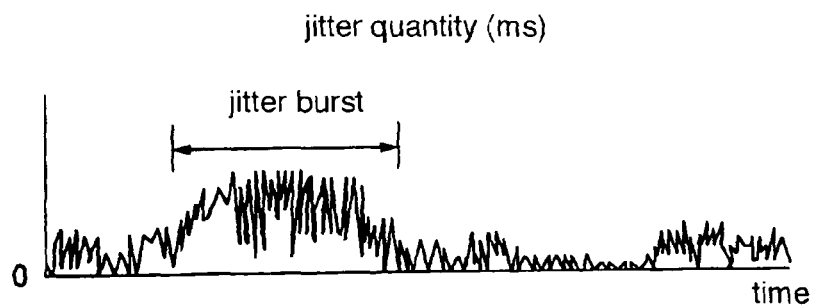
FIGS. 2(A), 2(B), 2(C) and 2(D) are explanatory charts for the operation of the jitter buffer in the first embodiment of the invention.

Now, the operation of the jitter buffer 101 in the first embodiment will be described concretely. FIG. 2(A) illustrates a concrete example of the quantity of jitter, which shows the quantity of jitter against the time base in unit of millisecond. The jitter is defined as an arrival time interval with the previous packet, and is given by a relative value. As shown in the drawing, the jitters of voice packets frequently occur at a burst through the network.

Figure 2B:
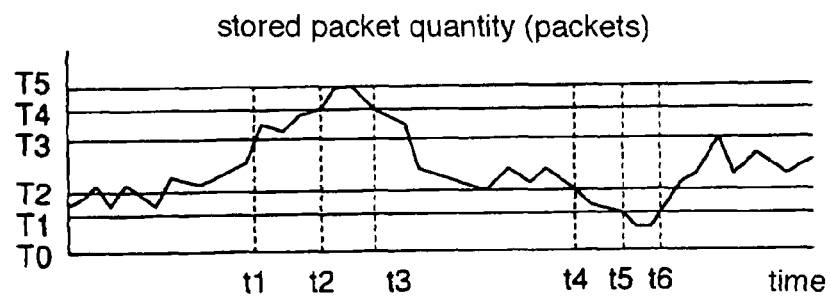

FIG. 2B) illustrates the stored quantity of voice packets into the buffer, which shows the packet stored quantity in unit of packet against the time base. In this illustration, the stored packet quantity Tj increases accompanying the jitter burst; it exceeds the level T3 at time t1, and it exceeds the lower limit T4 of the packet delete area 104 at time t2. When the jitter burst disappears to decrease the stored packet quantity Tj, it falls below the level T2 at time t4, and it falls below the upper limit T1 of the packet add area 105 at time t5.

Figure 2C:
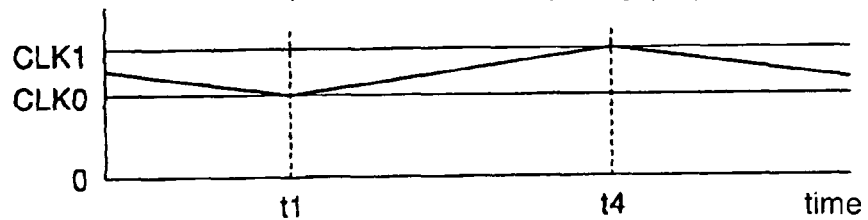

FIG. 2(C) shows a reproduced clock frequency against the time base. As shown in the drawing, the clock frequency is not changed discretely, but it is controlled continuously to vary smoothly. To control in this manner is to avoid that to change the clock frequency sharply creates distortions on reproduced sounds, which deteriorates the sound quality. In the example of the drawing, the change of the clock frequency is linear. The clock frequency falls up to time t1, and after the stored packet quantity Tj exceeds the level T3 at time t1 (see FIG. 2(A)), the clock frequency rises from CLKO to CLK1, which increases the packet quantity read from the jitter buffer 101. This suppresses a sharp increase of the stored packet quantity, which reduces the number of voice packets to be deleted. Since the stored packet quantity Tj falls below the level T2 at time t4, the clock frequency starts falling toward CLK0. This delays the speed of reading the packets from the jitter buffer 101, and lowers the provability by which the voice packets enter the packet add area, which makes it possible to reduce the number of voice packets to be added, thus contributing to enhancing the sound quality.

Figure 2D:
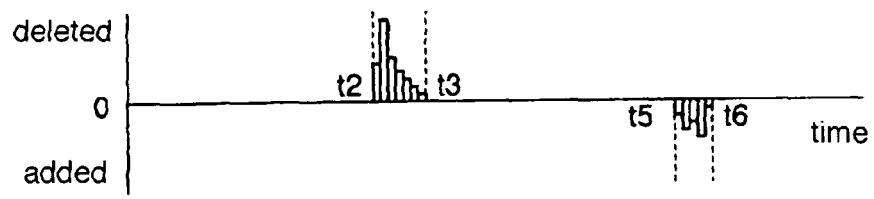

FIG. 2(D) shows the number of the packets to be added/deleted against the time base, when there occur the jitter fluctuations as shown in FIG. 2(A), and the stored packet quantity Tj of the jitter buffer 101 changes as shown in FIG. 2(B). Since the stored packet quantity Tj exceeds the lower limit T4 of the packet delete area 104 at time t2 through time t3, the packets are deleted. Since the stored packet quantity Tj falls below the upper limit T1 of the packet add area 105 at time t5 through time t6, the packets are added.

Figure 3:
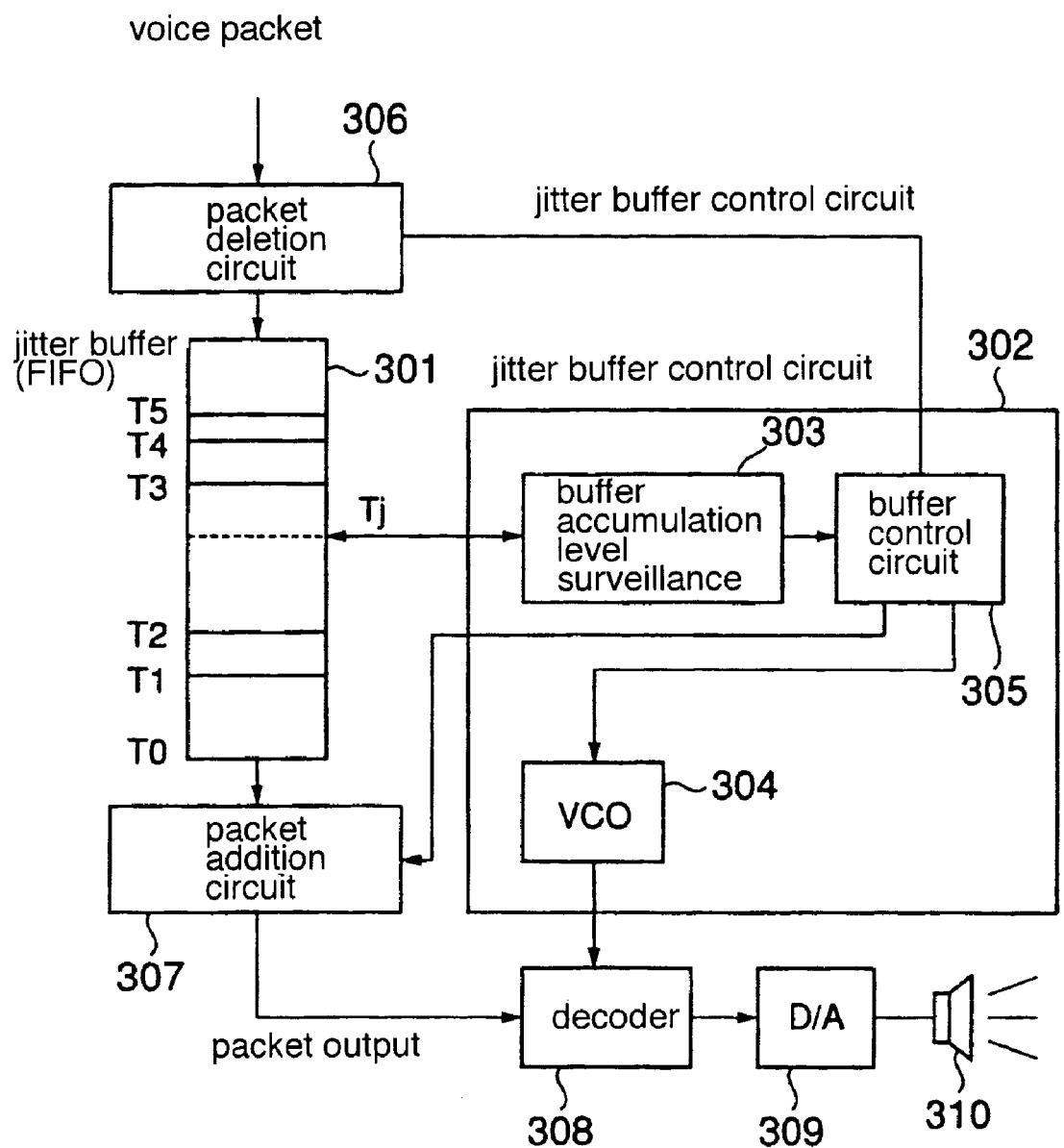
FIG. 3 is a block diagram of a control device for the jitter buffer in the first embodiment of the invention.

Next, the control device for controlling the jitter buffer 101 of this embodiment will be described. FIG. 3 illustrates a circuit configuration of the control device for the jitter buffer 101 in this embodiment.

This control device is made up mainly with a jitter buffer 301 and a jitter buffer control circuit 302. The jitter buffer 301 is generally configured with a FIFO built up inside a memory (RAM), however it can employ a FIFO as hardware.

The jitter buffer control circuit 302 is configured with a buffer accumulation level surveillance 303 that monitors the stored packet quantity Tj of the voice packets accumulated in the jitter buffer 301, a VCO (voltage controlled oscillator) 304 that supplies to vary the reproduced clock frequency as required, a buffer control circuit 305 that controls the operations of the jitter buffer 301 and the peripheral circuits. In replacement for the VCO, a PWM (Pulse Width Modulator) can be used as well.

The control device provides a packet deletion circuit 306 and a packet addition circuit 307 in the pre-stage and post-stage of the jitter buffer 301. The packet addition circuit 307 adds a specified packet under the control of the buffer control circuit 305, when the stored packet quantity Tj falls below the upper limit T1 of the packet add area inside the buffer control area. The packet deletion circuit 306 deletes the voice packets under the control of the buffer control circuit 305, when the stored packet quantity Tj exceeds the lower limit T4 of the packet delete area 104.

The voice packets entering the jitter buffer 301 pass through the packet deletion circuit 306 to be accumulated in the jitter buffer 301, and then pass through the packet addition circuit 307 to be delivered thereafter to a decoder 308.

The decoder 308 accepts the packets outputted from the packet addition circuit 307, and sends the frames of the voice packets being the contents of the packets outputted to a D/A converter 309 based on the clock signal supplied from the VCO 304. The D/A converter 309 converts the voice digital data of the frames into the analog signals to be outputted to a speaker 310, and the speaker 310 emits the voices reproduced.

Second Embodiment

Figure 5:
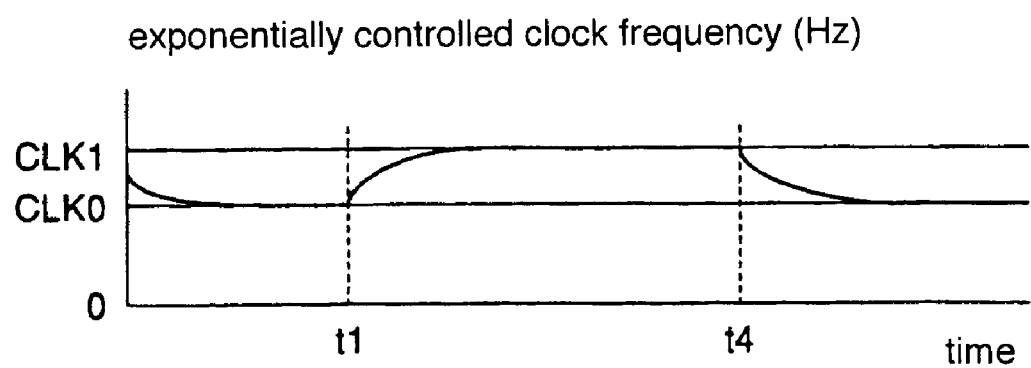
FIG. 5 illustrates an example of controlling the clock frequency in the second embodiment of the invention.

FIG. 5 illustrates a method of controlling the clock frequency in the second embodiment of the invention. The other components of the jitter control method are the same as those in the first embodiment. The clock frequency is controlled linearly in the first embodiment, however in the second embodiment, the clock frequency is controlled exponentially, which is the difference of both. That is, the control is executed based on the following expression.

$$CLK=CLK0+(CLK1-CLK0)*(1-EXP(-T/Td))$$

By setting the time constant Td in this expression smaller, instead of varying the clock frequency linearly at time t1 through time t4, the method varies at time t1 the clock frequency from the frequency of CLK0 to that of CLK1 in a very short time, and varies at time t4 the clock frequency from the frequency of CLK1 to that of CLK0 very quickly. The method controls the clock frequency in this manner to follow a sharp change in the accumulated quantity of the voice packets, lowers the provability by which the stored packet quantity Tj enters the packet delete area or the packet add area, and reduces the number of the packets to be deleted/added, thereby enhancing the sound quality of the reproduced voices.

The embodiments being thus described, the method of controlling the jitter buffer according to the invention provides the packet delete area and packet add area, the clock control area inside the FIFO that forms the jitter buffer. And, the method controls to delete the packets when the stored packet quantity Tj of the FIFO is within the packet delete area, to add the packets when the stored packet quantity Tj is within the packet add area, and to raise or lower the clock frequency for reading the packets when the stored packet quantity Tj is within the clock control area. Here, the clock control area is located between the packet add area and the packet delete area. Therefore, if there occurs a jitter burst, the method lowers the provability by which the packets accumulated in the FIFO enter the packet delete area or the packet add area, and lowers the provability to add/delete the packets, thus reducing distortions on the reproduced voices.

What is claimed is:

1. A method of controlling a jitter buffer using a FIFO, a packet deletion circuit, a packet addition circuit, and a jitter buffer control circuit, comprising the steps of:

setting a packet delete area, a packet add area, and a clock control area inside the FIFO;

controlling a stored packet quantity of the FIFO to delete a specified packet from an input side of the FIFO when the stored packet quantity exceeds a lower limit of the packet delete area, and to delete the packets when the stored packet quantity exceeds an upper limit of the packet delete area;

controlling the stored packet quantity of the FIFO to add a specified packet when the stored packet quantity falls below an upper limit of the packet add area, and to add the packets when the stored packet quantity falls below a lower limit of the packet add area;

raising a clock frequency when the stored packet quantity of the FIFO reaches an upper limit of the clock control area;

lowering the clock frequency when the stored packet quantity of the FIFO reaches a lower limit of the clock control area; and setting the clock control area between the packet add area and the packet delete area.

2. A method of controlling a jitter buffer as claimed in claim 1, wherein the lower limit of the packet add area is equal to the upper limit thereof.

3. A method of controlling a jitter buffer as claimed in claim 2, wherein the lowering of the clock frequency is linear from the upper limit of the clock control area to the lower limit thereof, and the raising of the clock frequency is linear from the lower limit of the clock control area to the upper limit thereof.

4. A method of controlling a jitter buffer as claimed in claim 2, wherein the lowering of the clock frequency is exponential from the upper limit of the clock control area to the lower limit thereof, and the raising of the clock frequency is exponential from the lower limit of the clock control area to the upper limit thereof.

5. A method of controlling a jitter buffer as claimed in claim 1, wherein the lowering of the clock frequency is linear from the upper limit of the clock control area to the lower limit thereof, and the raising of the clock frequency is linear from the lower limit of the clock control area to the upper limit thereof.

6. A method of controlling a jitter buffer as claimed in claim 1, wherein the lowering of the clock frequency is exponential from the upper limit of the clock control area to the lower limit thereof, and the raising of the clock frequency is exponential from the lower limit of the clock control area to the upper limit thereof.

7. A device of controlling a jitter buffer, comprising:

a FIFO, having an input side and an output side, that configures the jitter buffer;

a packet deletion circuit provided on the input side of the FIFO;

a packet addition circuit provided on the output side of the FIFO;

a jitter buffer control circuit that includes a buffer accumulation level surveillance that monitors a stored packet quantity accumulated in the FIFO, a VCO that supplies to vary a reproduced clock frequency, and a buffer control circuit for controlling the operations of the FIFO and peripheral circuits thereof, wherein the buffer control circuit controls the quantity of packets accumulated in the FIFO to delete the packets when the stored packet quantity exceeds a lower limit of a packet delete area, and the buffer control circuit controls to add the packets when the stored packet quantity falls below an upper limit of a packet add area; and a decoder that accepts the packets outputted from the packet addition circuit, and decodes frames of the packets based on the clock frequency supplied from the VCO.

8. A device of controlling a jitter buffer as claimed in claim 7, wherein a pulse width modulator is used in replacement for the VCO.

9. A device of controlling a jitter buffer as claimed in claim 7, wherein the jitter buffer control circuit is in direct communication with the packet deletion circuit and the packet addition circuit.

10. A device of controlling a jitter buffer as claimed in claim 9, wherein the packet deletion circuit and the packet addition circuit are in direct communication with the buffer control circuit of the jitter buffer control circuit.

11. A device of controlling a jitter buffer as claimed in claim 7, wherein the jitter buffer control circuit is in direct communication with the jitter buffer.

12. A device of controlling a jitter buffer as claimed in claim 11, wherein the jitter buffer is in direct communication with a buffer monitoring portion of the jitter buffer control circuit.

* * * * *